United States Patent [19]

Grossman

[11] Patent Number: 5,583,340
[45] Date of Patent: Dec. 10, 1996

[54] COUPLING APPARATUS FOR MULTIMODE INFRARED DETECTORS

[75] Inventor: Erich Grossman, Boulder, Colo.

[73] Assignee: The United States of America, as represented by the Secretary of Commerce, Washington, D.C.

[21] Appl. No.: 488,734

[22] Filed: Jun. 8, 1995

[51] Int. Cl.⁶ ............................................. H01L 31/0232
[52] U.S. Cl. .................................. 250/353; 250/338.1
[58] Field of Search .......................... 250/353, 339.02, 250/338.01, 339.14; 343/720, 725

[56] References Cited

U.S. PATENT DOCUMENTS

| | | |
|---|---|---|
| 2,984,747 | 5/1961 | Walker. |
| 4,479,056 | 10/1984 | Zierhut. |
| 4,754,139 | 6/1988 | Ennulat et al.. |
| 4,791,427 | 12/1988 | Raber et al. ............................. 343/754 |
| 5,239,179 | 8/1993 | Baker. |
| 5,254,858 | 10/1993 | Wolfman et al.. |

OTHER PUBLICATIONS

DeWaard et al "Minature Optically Immersed Thermistor Bolometer Arrays", Applied Optics, vol. 6, No. 8 (Aug.–67).

Primary Examiner—Davis L. Willis
Assistant Examiner—Richard Hanig
Attorney, Agent, or Firm—Larson & Taylor

[57] ABSTRACT

An optical coupling apparatus for a multimode infrared detector comprises a flux concentrator including a conical cavity, such as a Winston cone, having an entrance aperture for receiving infrared radiation and an exit aperture, and an integrating cavity in communication with the exit aperture of the conical cavity. A planar multimode antenna comprising a plurality of discrete antennas mounted on a silicon substrate is disposed within the integrating cavity so as to receive infrared radiation coupled into the integrating cavity through the exit aperture.

20 Claims, 1 Drawing Sheet

U.S. Patent    Dec. 10, 1996    5,583,340
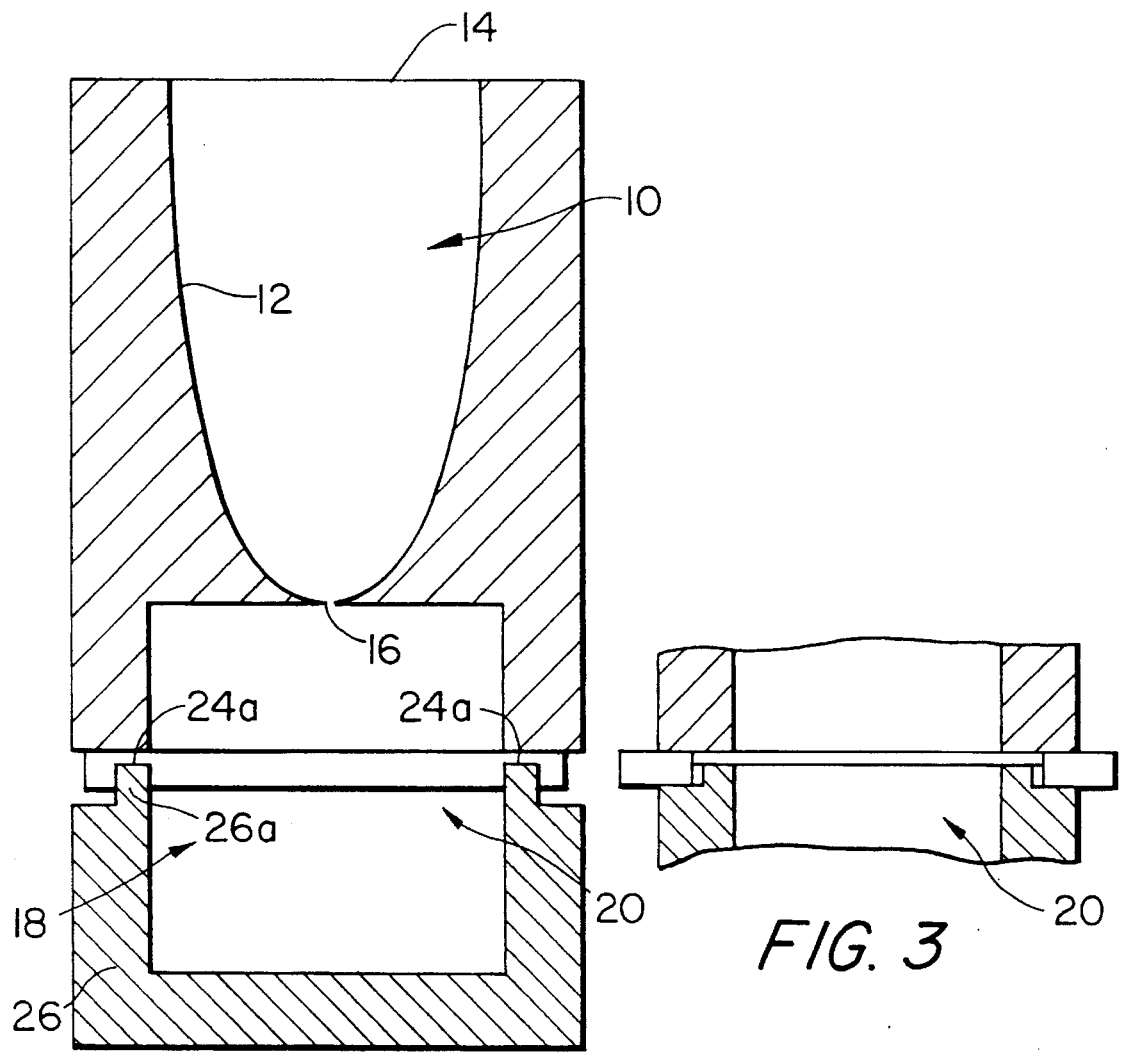
FIG. 1
FIG. 3
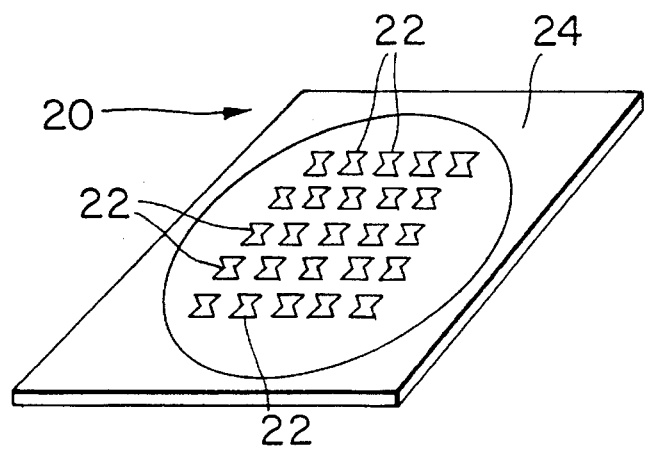
FIG. 2

COUPLING APPARATUS FOR MULTIMODE INFRARED DETECTORS

BACKGROUND OF THE INVENTION

1. Field of the Invention

The invention relates to multimode infrared detectors and, more particularly, to a novel optical coupling apparatus for such detectors.

2. The Prior Art

Prior infrared measurement systems for "multimode" sources, i.e., sources whose image sizes are not limited by diffraction, generally suffer disadvantages with respect to efficiency and speed of operation. A multimode source can be defined a source for which the throughput of the infrared beam is much larger than a square wavelength, a relationship which can be represented by the equation $A \Omega >> \lambda^2$, wherein $A$ is the cross-sectional area of the beam, $\Omega$ is the solid angle subtended by the beam and $\lambda$ is the wavelength of interest. Another way of describing a multimode application is as one in which diffraction-limited spatial resolution is not required and one which concerns only a measurement of average infrared surface temperature, i.e., infrared power per unit solid angle. This excludes many imaging applications such as those involving large telescopes and distant sources (e.g., satellite-based infrared surveillance and astronomical imaging) but includes a wide variety of smaller scale terrestrial applications in, e.g., infrared laboratory instrumentation and industrial process control.

As will appear, the present invention is, broadly speaking, a combination of two units or components which are known per se in the prior art. The first of these is an ideal flux concentrator and such a flux concentrator is described, for example, in Harper et al, "Heat trap: an optimized far infrared field optics systems," Applied Optics, 15, pp. 53–60 (1976). An idea flux concentrator comprises a reflecting metal cone of specific tapered geometry, having a wide end and small end, and backed at the small end by a hollow metal-walled cavity (referred to as an "integrating cavity"). Infrared radiation enters the concentrator through the wide end of the metal cone, and exits through an aperture at the small end of the cone into the integrating cavity. The shape of the cone is that of an off-axis parabola, rotated about the optical axis. In the limit of short wavelength, a concentrator device of this kind achieves the highest degree of infrared flux concentration allowed by the laws of optics. Such cones, known as Winston cones, have been used for many years in conjunction with bolometers, and this is what is disclosed in the Harper et al article referred to above. Such bolometers have high thermal mass and, are therefore, low speed devices, because these bolometers must have absorbing areas much larger than the entrance area of the cavity.

Exemplary patents of interest in the field include U.S. Pat. Nos. 2,984,747 (Walker), 4,479,056 (Zeirhut), 4,754,139 (Ennulat et al), 5,239,179 (Baker), and 5,254,858 (Wolfman et al). The Walker patent discloses an infrared sensor located adjacent to the focus of a cone-shaped radiation collector, with the sensor being positioned within an integrating hemisphere affixed to the bottom of the collector. The Zeirhut patent discloses an infrared radiation responsive motion detector wherein a cone is used to focus radiation on an infrared detector. The Wolfman et al patent discloses the use of a cone non-imaging concentrator for spectroscopy. The Ennulat et al patent discloses an array of flux concentrators for focusing infrared radiation onto a detector array to improve efficiency without cooling the array. The Baker patent discloses an array of non-lens concentrators associated with an infrared detector array.

SUMMARY OF THE INVENTION

In accordance with the invention an optical coupling apparatus is provided for a multimode infrared detector, the coupling apparatus comprising a flux concentrator including a conical cavity having an entrance aperture for receiving infrared radiation and an exit aperture, and an integrating cavity in communication with the exit aperture of the conical cavity; and a multimode antenna mounted within the integrating cavity for receiving infrared radiation coupled into the integrating cavity through the exit aperture.

As set forth above, such flux concentrators are known per se and multimode antenna arrays are also described in the open literature. However, the combination is novel and, in accordance with the invention, the two devices are combined in such a way as to overcome the drawbacks of each individual device, viz., the low efficiency of systems based on a multimode antenna and the low speed of systems based on an ideal flux concentrator. With the coupling structure of the invention, infrared measurement systems for multimode sources can be provided which achieve high efficiency and high speed simultaneously.

Preferably, the conical cavity has the shape of an off-axis parabola rotated about the optical axis of the flux concentrator and comprises a Winston cone. The multimode antenna array advantageously comprises a plurality of bow tie antennas arranged in rows and columns, although other antennas in different configurations can also be employed. More generally, the multimode antenna array preferably comprises a plurality of discrete antennas deposited lithographically on a substrate that is transparent over the range of operating wavelengths, such as a silicon chip substrate. The substrate is mounted within the integrating cavity and preferably includes portions of reduced thickness intersecting the walls of the integrating cavity.

In another embodiment, the multimode antenna array comprises a membrane substrate and a plurality of discrete antennas disposed on that membrane substrate. The membrane substrate advantageously comprises a silicon oxynitride membrane. Further, the array preferably includes a silicon frame disposed outside of the integrating cavity for supporting the membrane substrate.

The integrating cavity preferably comprises an upper portion coupled to the exit aperture of the flux concentrator and a separate lower portion supporting the multimode antenna array such that the array substrate is captured between the upper and lower portions of the integrating cavity.

Other features and advantages of the invention will be set forth in, or apparent from, the following detailed description of preferred embodiments of the invention.

BRIEF DESCRIPTION OF THE DRAWINGS

FIG. 1 is a schematic cross sectional view of a preferred embodiment of the optical coupling structure of the invention;

FIG. 2 is a perspective view of a preferred embodiment of the multimode antenna of FIG. 1; and FIG. 3 is a schematic cross sectional view of a portion of the structure of FIG. 1, illustrating an alternative embodiment.

DESCRIPTION OF THE PREFERRED EMBODIMENTS

Referring to FIG. 1, there is shown a preferred embodiment of the coupling structure or apparatus for multimode infrared detectors, according to the invention. The device basically comprises an ideal flux concentrator ("Winston cone") 10 and a multimode antenna array 20. The concentrator 10 comprises a generally conical shaped cavity 12 which is, more accurately, in the shape of an off-axis parabola, rotated about the optical axis, i.e., the longitudinal axis of the cavity 12. Cavity 12 includes an entrance aperture 14 and exit aperture 16, and the off-axis angle, and the diameters of the entrance and exit apertures 14 and 16 are critical design parameters of the conical cavity 12 and are chosen to provide the desired operating characteristics.

The multimode antenna array 20 is mounted in an integrating cavity 18 which is disposed at the exit aperture 16 of conical cavity 12 in communication therewith and which is generally cylindrical in shape. The conical cavity 12 and associated integrating cavity 18 are of the type disclosed in the Harper et al. article mentioned above.

As is best seen in FIG. 2, the multimode antenna array 20 is a two-dimensional array of lithographic antennas 22 deposited on an infrared-transparent substrate 24 preferably fabricated of silicon. A microbolometer (not shown) is provided at the feed of each of antenna 22. A planar multimode array of this type is disclosed in Rutledge et al., "Planar Multimode Detector Arrays for Infrared and Millimeter-Wave Applications," IEEE J. of Quantum Electronics, QE-17, pp. 407-414 (1981).

Lithographic antenna such as antennas 22 can have a large effective absorbing area but a very small thermal mass for the associated microbolometer (not shown), thereby overcoming the speed limitations of conventional bolometers in integrating cavities. A single antenna can couple only to a single spatial mode of an infrared source while an array of N antennas can couple to multimode source with N modes. A significant drawback of "bare" antenna arrays, i.e., arrays such as disclosed in the Rutledge et al. article referred to above, is that the pitch must be kept low in order to avoid the antenna response being drawn into off-axis "grating modes" which reduces efficiency. However, inside the integrating cavity 18, grating modes are equally well coupled to the incident radiation as the main broadside mode.

In the embodiment of FIG. 2, antennas 22 are bow tie antennas arranged in rows and columns as illustrated, but it will be understood that the antennas 22 can be of a variety of different forms and types and arranged in different patterns. Other critical design choices for the designer include the pitch of the array in each dimension, and the bias topology i.e., whether series, parallel or combination of the two. The circular outline of the cylindrical integrating cavity 18 is indicated at 25 in FIG. 2.

An important consideration in mounting the multimode antenna array 20 inside the integrating cavity 18 of the ideal flux concentrator 10 is the means for bringing the electrical leads (not shown) off of the antenna array 20 to the outside of the integrating cavity 18, i.e., bringing the antenna leads out of the cavity. The feed-throughs, i.e., the connections through the cavity wall, must be smaller than a wavelength in at least one dimension so as to prevent leakage of the infrared radiation out of the cavity 18 with attendant loss of efficiency.

Referring again to FIG. 1, the foregoing is accomplished in accordance with a further important feature of the invention by making the silicon chip or substrate 24 as thin as possible at the point where the substrate 24 intersects the wall of the cavity 18, and by coating the upper surface of the electrical leads with thin-film dielectric. The dielectric thickness of the substrate 24 at the point of intersection with the wall of cavity 18 determines the short wavelength cut-off of the device. The reduced thickness of substrate or chip 24 is indicated at 24a in FIG. 1. In the illustrated embodiment the lower portion of integrating cavity 18 is formed by a cylinder 26 which is closed at the bottom and which includes a relatively thin, annular raised portion or rim 26a at the flat upper edge thereof. This rim 26a engages with and supports the annular reduced thickness portion 24a of substrate or chip 24.

For longer wavelength operation, a simple silicon chip as described above can be used as the substrate 24. An alternative embodiment particularly adapted for shorter wavelength operation is illustrated in FIG. 3 wherein the silicon chip is replaced by a silicon oxynitride membrane 28 as the substrate for the antenna array 20. Membrane 28 is much thinner than a conventional silicon chip and, in the illustrated embodiment, is supported by an outer annular silicon support frame 30 which lies entirely outside of the integrating cavity 18 as shown. The use of membrane 28 also simplifies the analysis of the antenna performance.

It will be appreciated from the foregoing that the multimode array of the inventions constitutes a single detector—the array configuration provided is not for imaging but for increasing collection area without compromising speed. In this sense, the multimode array is functionally a part of the collection optics.

Although the present invention has been described relative to specific exemplary embodiments thereof, it will be understood by those skilled in the art that variations and modifications can be effected in these exemplary embodiments without departing from the scope and spirit of the invention.

What is claimed is:

1. An optical coupling apparatus for a multimode infrared detector, said coupling apparatus comprising a flux concentrator including a conical cavity having an entrance aperture for receiving infrared radiation and an exit aperture, and an integrating cavity in communication with the exit aperture of said conical cavity; and a multimode antenna mounted within said integrating cavity for receiving infrared radiation coupled into said integrating cavity through said exit aperture.

2. An apparatus as claimed in claim 1 wherein said conical cavity has the shape of an off-axis parabola rotated about the optical axis of the flux concentrator.

3. An apparatus as claimed in claim 1 wherein said flux concentrator comprises a Winston cone.

4. An apparatus as claimed in claim 1 wherein said multimode antenna array comprises a plurality of bow tie antennas arranged in rows and columns.

5. An apparatus as claimed in claim 1 wherein said multimode antenna array comprises a plurality of discrete antennas deposited lithographically on a substrate that is transparent over the range of operating wavelengths of the apparatus.

6. An apparatus as claimed in claim 1 wherein said multimode antenna array comprises a substrate mounted within said integrating cavity and including portions of reduced thickness intersecting the walls of the integrating cavity.

7. An apparatus as claimed in claim 1 wherein said multimode antenna array comprises a membrane substrate and a plurality of discrete antennas disposed on said membrane substrate.

8. An apparatus as claimed in claim 7 wherein said membrane substrate comprises a silicon oxynitride membrane.

9. An apparatus as claimed in claim 7 wherein said array includes a frame disposed outside of said integrating cavity for supporting said membrane substrate.

10. An apparatus as claimed in claim 1 wherein said integrating cavity comprises a metal-walled cylindrical cavity.

11. An apparatus as claimed in claim 1 wherein said integrating cavity comprises an upper portion coupled to said exit aperture of said flux concentration and a separate lower portion supporting said multimode antenna array, said array including a substrate captured between said upper and lower portions of said integrating cavity.

12. An optical coupler device for multimode infrared detectors, said device comprising:
 a flux concentrator for receiving infrared radiation and comprising a Winston cone having an entrance aperture and an exit aperture, and a integrating cavity coupled to said exit aperture of said Winston cone; and
 a planar multimode antenna array mounted within said integrating cavity for receiving infrared radiation coupled into said integrating cavity.

13. A device as claimed in claim 12 wherein said multimode antenna array comprises a plurality of bow tie antennas arranged in rows and columns.

14. A device as claimed in claim 12 wherein said multimode antenna array comprises a plurality of discrete antennas deposited lithographically on a substrate that is transparent over the range of operating wavelengths of the apparatus.

15. A device as claimed in claim 12 wherein said multimode antenna array comprises a silicon substrate mounted within said integrating cavity and including portions of reduced thickness intersecting the walls of the integrating cavity.

16. A device as claimed in claim 12 wherein said multimode antenna array comprises a membrane substrate and a plurality of discrete antennas disposed on said membrane substrate.

17. A device as claimed in claim 16 wherein said membrane substrate comprises a silicon oxynitride membrane.

18. A device as claimed in claim 16 wherein said array includes a frame disposed outside of said integrating cavity for supporting said membrane substrate.

19. A device as claimed in claim 12 wherein said integrating cavity comprises a metal-walled cylindrical cavity.

20. An apparatus as claimed in claim 12 wherein said integrating cavity comprises an upper portion coupled to said exit aperture of said flux concentration and a separate lower portion supporting said multimode antenna array, said array including a substrate captured between said upper and lower portions of said integrating cavity.

\* \* \* \* \*